United States Patent
He et al.

(10) Patent No.: US 11,846,812 B2
(45) Date of Patent: Dec. 19, 2023

(54) EASY-TO-UNLOCK OPTICAL MODULE

(71) Applicant: Dongguan Kang Xiang Electronics Co., Ltd., Guangzhou (CN)

(72) Inventors: Xirong He, Guangzhou (CN); Ming Luo, Guangzhou (CN)

(73) Assignee: Dongguan Kang Xiang Electronics Co., Ltd., Guangzhou (CN)

( * ) Notice: Subject to any disclaimer, the term of this patent is extended or adjusted under 35 U.S.C. 154(b) by 235 days.

(21) Appl. No.: 17/554,109

(22) Filed: Dec. 17, 2021

(65) Prior Publication Data

US 2022/0196930 A1 Jun. 23, 2022

(30) Foreign Application Priority Data

Dec. 18, 2020 (CN) .......................... 202011506331.4

(51) Int. Cl.
*G02B 6/38* (2006.01)
(52) U.S. Cl.
CPC ................. *G02B 6/3898* (2013.01)
(58) Field of Classification Search
CPC .................................................. G02B 6/3898
See application file for complete search history.

(56) References Cited

U.S. PATENT DOCUMENTS

| 8,571,375 | B1 * | 10/2013 | Kyi ..................... G02B 6/4284 439/372 |
| 2013/0322832 | A1 * | 12/2013 | Wang .................. G02B 6/4261 385/92 |

* cited by examiner

*Primary Examiner* — Sung H Pak
*Assistant Examiner* — Hoang Q Tran
(74) *Attorney, Agent, or Firm* — NIELDS, LEMACK & FRAME, LLC (57) ABSTRACT

The present disclosure relates to an easy-to-unlock optical module. The easy-to-unlock optical module includes an optical module body and a mechanism of a pull ring for unlocking or locking connection between the optical module body and a metal cage. The mechanism of the pull ring includes a cover plate and the pull ring arranged on the optical module body. A pivot part for pivotally connecting the optical module body, and a first rotating arm and a second rotating arm respectively located on front and rear sides of the pivot part are arranged on the cover plate, and a lock head protrusion for matching with a spring lock groove on the metal cage is formed in the first rotating arm. The pull ring is pivotally connected to the optical module body, an unlocking contact surface and a locking contact surface are formed in the pull ring.

10 Claims, 14 Drawing Sheets

EASY-TO-UNLOCK OPTICAL MODULE

TECHNICAL FIELD

The present disclosure relates to the technical field of optical modules, and in particular to an easy-to-unlock optical module.

BACKGROUND ART

Steady development of the global telecommunication industry and steady growth of broadband users have laid a solid foundation for the development of the optical communication industry. With the continuous increase in global bandwidth demand and the expansion of application fields in the optical communication industry such as data centers and security monitoring, optical fiber broadband access has become the mainstream communication mode. Driven by the popularization of terminals such as smartphones and applications such as video and cloud computing, telecom operators continue to invest in the construction and upgrade of mobile broadband networks and optical fiber broadband networks, and the scale of investment in optical communication equipment has also been further expanded.

The rapid development of the optical communication industry has also driven the upgrade of optical modules. The existing optical module is generally inserted into a metal cage of a host through an unlocking device. Often, the existing unlocking device resets a pull ring through the resetting of an elastic member. The overall structure is complicated. At the same time, the stability and reliability of the elastic member are poor. After a period of use, it is easy to lose the elastic force, which in turn affects the normal use of the unlocking device.

Therefore, in the patent application of the present disclosure, the applicant carefully studies an easy-to-unlock optical module to solve the above problems.

SUMMARY

In view of the shortcomings of the above prior art, an objective of the present disclosure is to provide an easy-to-unlock optical module, which can realize unlocking and locking between an optical module body and a metal cage, is convenient to use, has a compact structure, eliminates an elastic structure in the traditional technology, reduces the cost, and improves the stability and reliability during use.

In order to achieve the aforementioned objective, the present disclosure adopts the following technical solution.

An easy-to-unlock optical module includes an optical module body and a mechanism of a pull ring for unlocking or locking connection between the optical module body and a metal cage. The mechanism of the pull ring includes a cover plate and the pull ring arranged on the optical module body.

A pivot part for pivotally connecting the optical module body, and a first rotating arm and a second rotating arm respectively located on front and rear sides of the pivot part are arranged on the cover plate, and a lock head protrusion for matching with a spring lock groove on the metal cage is formed in the first rotating arm.

The pull ring is pivotally connected to the optical module body, an unlocking contact surface and a locking contact surface are formed in the pull ring, and the second rotating arm selectively abuts against the unlocking contact surface or the locking contact surface.

When the optical module body is pulled out from the metal cage, after the pull ring is rotated, the unlocking contact surface abuts against the second rotating arm to separate the lock head protrusion from the spring lock groove of the metal cage.

When the optical module body is plugged into the metal cage for use, after the optical module body is inserted into the metal cage and the pull ring is rotated in an opposite direction, the locking contact surface abuts against the second rotating arm to make the lock head protrusion interlocked with the spring lock groove of the metal cage.

As a preferred solution, the pull ring may include a cross arm extending in a left-right direction and a cantilever integrally connected to the cross arm, the cross arm may be pivotally connected to the optical module body, and the unlocking contact surface and the locking contact surface may be both formed in the cross arm.

As a preferred solution, a protruding part may be formed in the cross arm, the protruding part and the cantilever may be respectively located on opposite sides of the cross arm, the unlocking contact surface and the locking contact surface may be both formed in the protruding part, and a step may be formed between the unlocking contact surface and the locking contact surface.

As a preferred solution, a force-bearing inclined surface inclined upward from front to back may be formed in a lower end surface of the second rotating arm, and the force-bearing inclined surface may selectively abut against the unlocking contact surface or the locking contact surface.

As a preferred solution, an extension block may protrude downward from the force-bearing inclined surface, a guide shaft part may protrude inward from an inner side surface of the extension block, a guide groove penetrating into the inside of the cross arm may be correspondingly recessed into the protruding part, and the guide shaft part may be fitted in the guide groove.

As a preferred solution, a rotation space for step rotation may be formed between the guide shaft part and the force-bearing inclined surface.

As a preferred solution, a relief groove may be formed in a position of the cross arm corresponding to the extension block, and the relief groove may be communicated with the guide groove. An opening may be formed in the locking contact surface, and the opening may be communicated with the guide groove.

As a preferred solution, a plug connector may be arranged at a rear end of the optical module body, the plug connector may be exposed outside the optical module body, an elastic contact end may be formed in the plug connector, a through hole penetrating inner and outer sides of the cantilever may be formed in the cantilever, and the elastic contact end may be fitted in the through hole and may extend out of the cantilever.

As a preferred solution, a hand-held part may protrude inward from an inner side of the cantilever, and a groove for fingers to hold may be formed in the hand-held part.

As a preferred solution, the optical module body may include a base and a circuit board, a mounting cavity penetrating back and forth may be formed in the base, and the circuit board may be mounted in the mounting cavity.

An upper end opening may be formed in the mounting cavity, the pivot part of the cover plate may be pivotally connected to the upper end opening of the mounting cavity and the cover plate may cover the upper end opening of the mounting cavity, and the pull ring may be pivotally connected to a rear end of the base.

Compared with the prior art, the present disclosure has obvious advantages and beneficial effects. Specifically, the easy-to-unlock optical module can realize unlocking and locking between the optical module body and the metal cage, is convenient to use, has a compact structure, eliminates an elastic structure in the traditional technology, and improves the stability and reliability during use mainly through the mechanism of the pull ring.

Secondly, through the cooperation of the guide shaft part and the guide groove, the efficiency and stability of locking are improved.

Furthermore, through the cooperation of the elastic contact end of the plug connector and the through hole on the pull ring, the pull ring can be stored in the plug connector after locking, so as to save space, make the appearance of the easy-to-unlock optical module more beautiful, and increase the practicability of the easy-to-unlock optical module. In particular, the groove is formed in the pull ring to facilitate separation of the pull ring from the plug connector.

In addition, the overall structure design is ingenious and reasonable, and the components are assembled easily and firmly, which further ensures the stability and reliability during use.

In order to explain the structural features and effects of the present disclosure more clearly, it will be described in detail below in combination with the accompanying drawings and specific embodiments.

DESCRIPTION OF REFERENCE NUMERALS 10, optical module body,
101, mounting cavity,
11, base,
111, first rear mounting block,
112, second rear mounting block,
113, rotating shaft,
114, vertical groove,
115, transverse groove,
12, circuit board,
13, plug connector,
131, elastic contact end,
14, first limiting housing,
15, second limiting housing,
20, cover plate,
21, first rotating arm,
211, lock head protrusion,
22, second rotating arm,
221, force-bearing inclined surface,
222, extension block,
223, guide shaft part,
23, pivot part,
30, pull ring,
31, cross arm,
311, protruding part,
312, unlocking contact surface,
313, locking contact surface,
314, left mounting ear part,
315, right mounting ear part,
316, arc transition surface,
317, pivot hole,
318, relief groove,
32, cantilever,
321, through hole,
33, hand-held part,
331, groove,
341, first groove surface,
342, second groove surface,
343, introduction slope,
344, transition slope,
40, metal cage, and
41, spring lock groove.

DETAILED DESCRIPTION OF THE EMBODIMENTS

The present disclosure is further described in detail below in combination with the accompanying drawings and specific implementations.

As shown in FIG. 1 to FIG. 14, an easy-to-unlock optical module includes an optical module body 10 and a mechanism of a pull ring 30 for unlocking or locking connection between the optical module body 10 and a metal cage 40. The mechanism of the pull ring 30 includes a cover plate 20 and the pull ring 30 arranged on the optical module body 10.

A pivot part 23 for pivotally connecting the optical module body 10, and a first rotating arm 21 and a second rotating arm 22 respectively located on front and rear sides of the pivot part 23 are arranged on the cover plate 20, and a lock head protrusion 211 for matching with a spring lock groove 41 on the metal cage 40 is formed in the first rotating arm 21.

The pull ring 30 is pivotally connected to the optical module body 10, an unlocking contact surface 312 and a locking contact surface 313 are formed in the pull ring 30, and the second rotating arm 22 selectively abuts against the unlocking contact surface 312 or the locking contact surface 313.

In the case that the optical module body 10 has been plugged into the metal cage 40 for use, when the optical module body 10 is pulled out from the metal cage 40, after the pull ring 30 is rotated, the unlocking contact surface 312 abuts against the second rotating arm 22 to separate the lock head protrusion 211 from the spring lock groove 41 of the metal cage 40.

When the optical module body 10 is plugged into the metal cage 40 for use, after the optical module body 10 is inserted into the metal cage 40 and the pull ring 30 is rotated in an opposite direction, the locking contact surface 313 abuts against the second rotating arm 22 to make the lock head protrusion 211 interlocked with the spring lock groove 41 of the metal cage 40.

Figure 1:
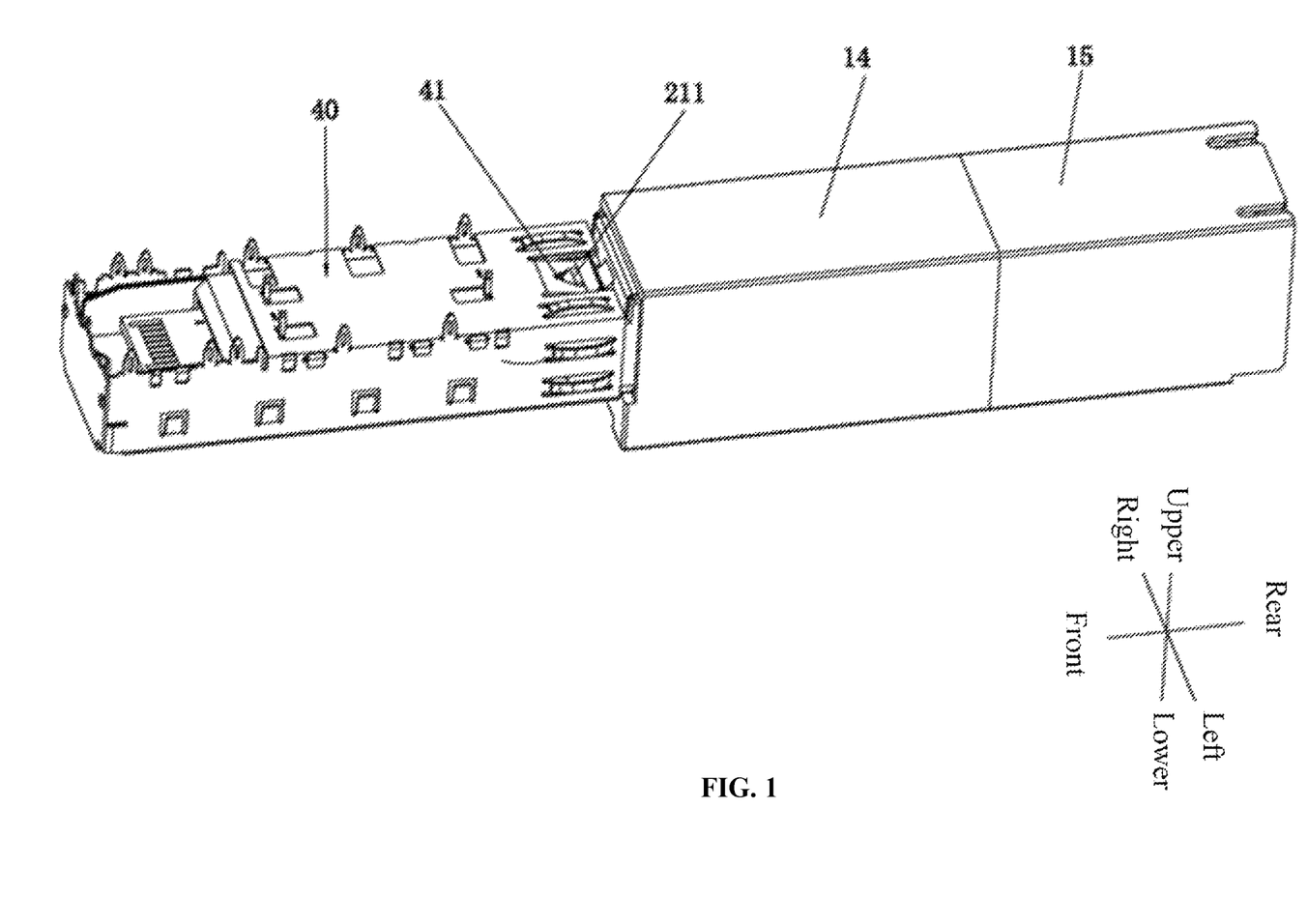
FIG. 1 is a schematic diagram of a three-dimensional assembly structure of an embodiment of the present disclosure (when an optical module body has been plugged into a metal cage for use)
Figure 2:
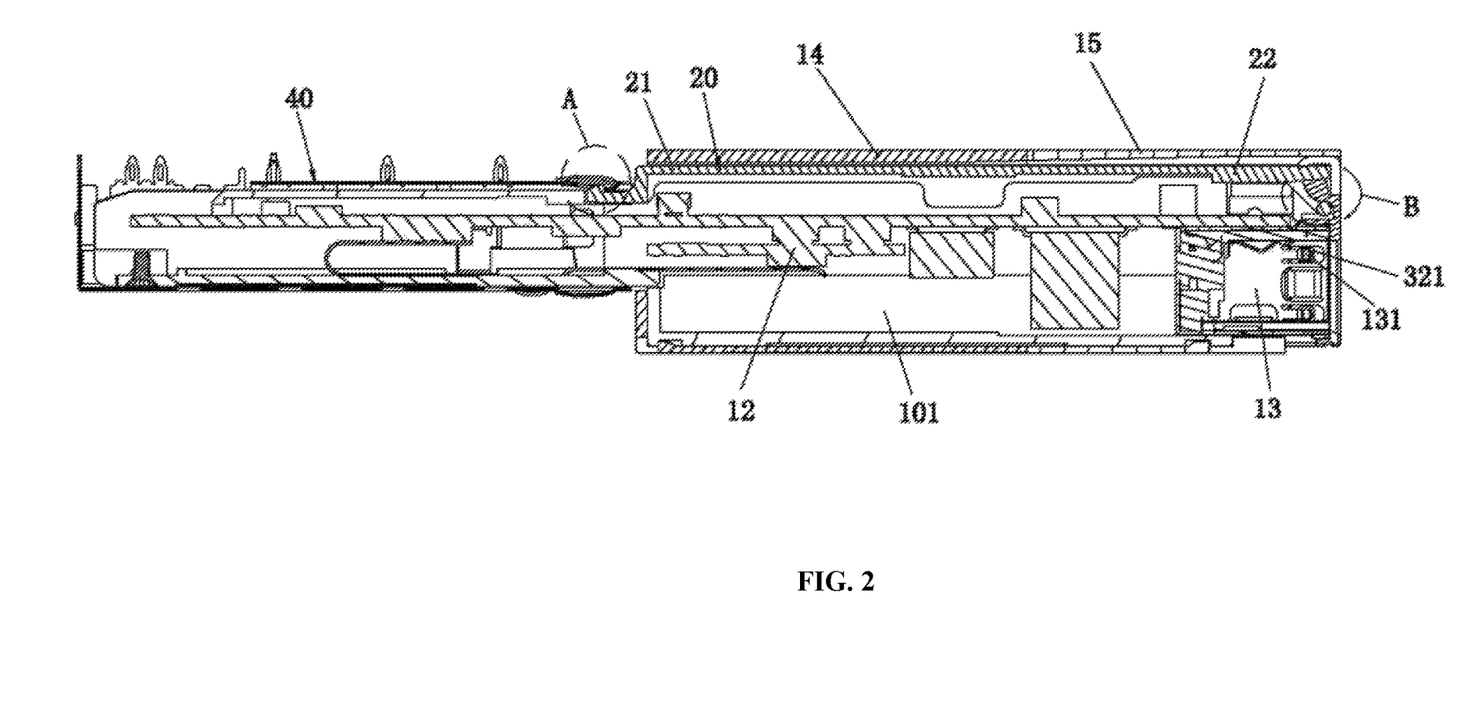
FIG. 2 is a schematic diagram of a first cross-sectional structure of the embodiment of the present disclosure (showing that the optical module body has been plugged into the metal cage for use)
Figure 3:
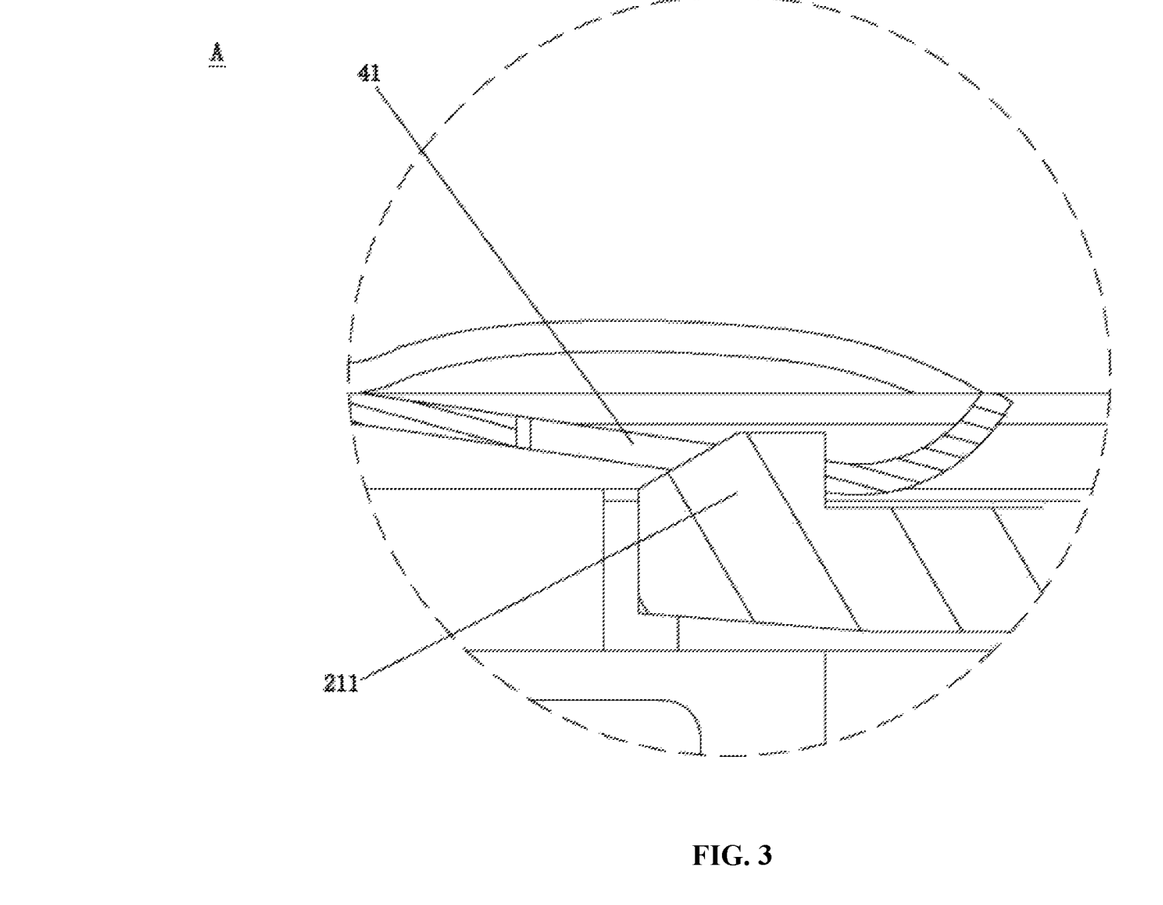
FIG. 3 is an enlarged schematic diagram of A in FIG. 2.
Figure 4:
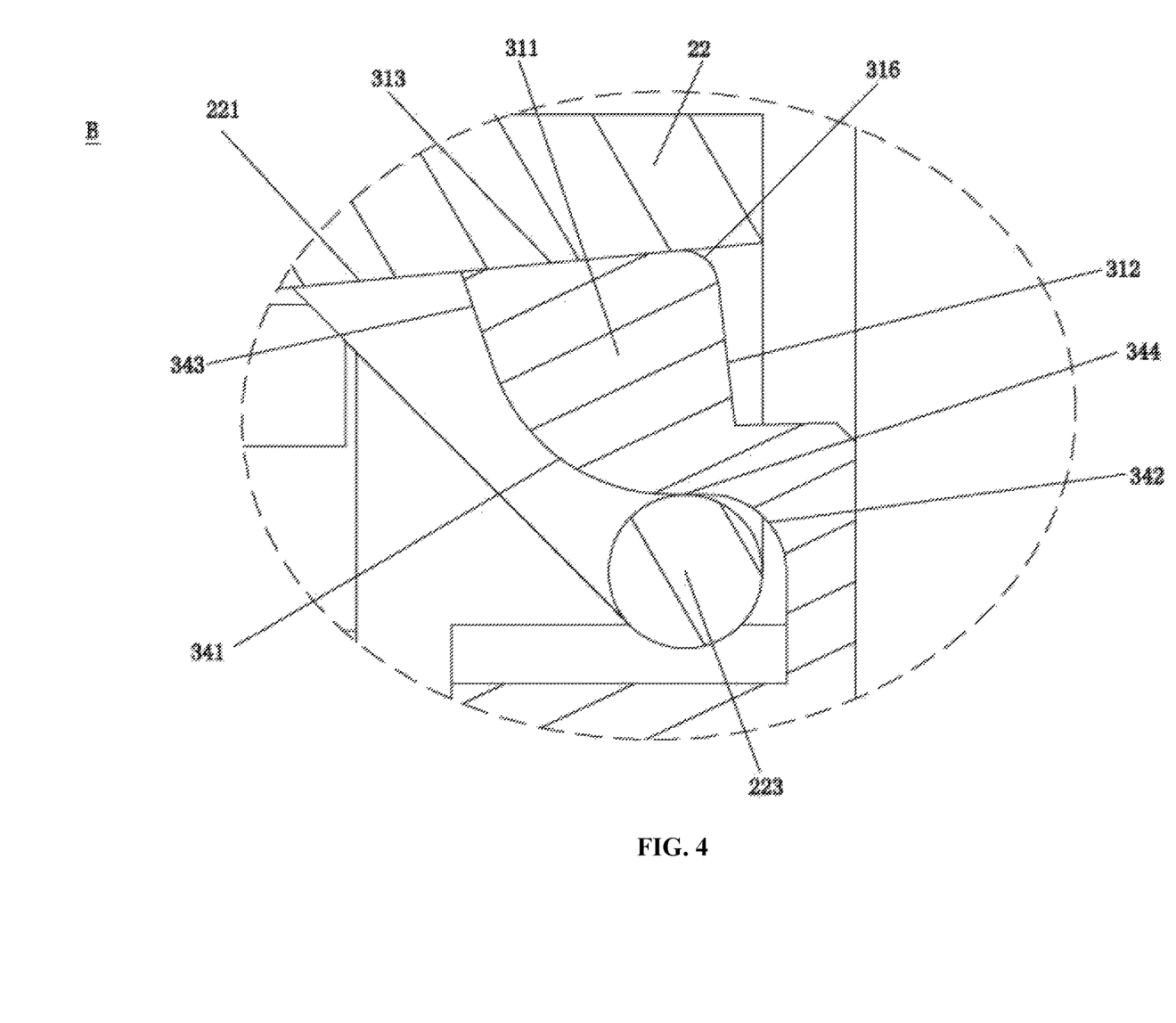
FIG. 4 is an enlarged schematic diagram of B in FIG. 2.
Figure 5:
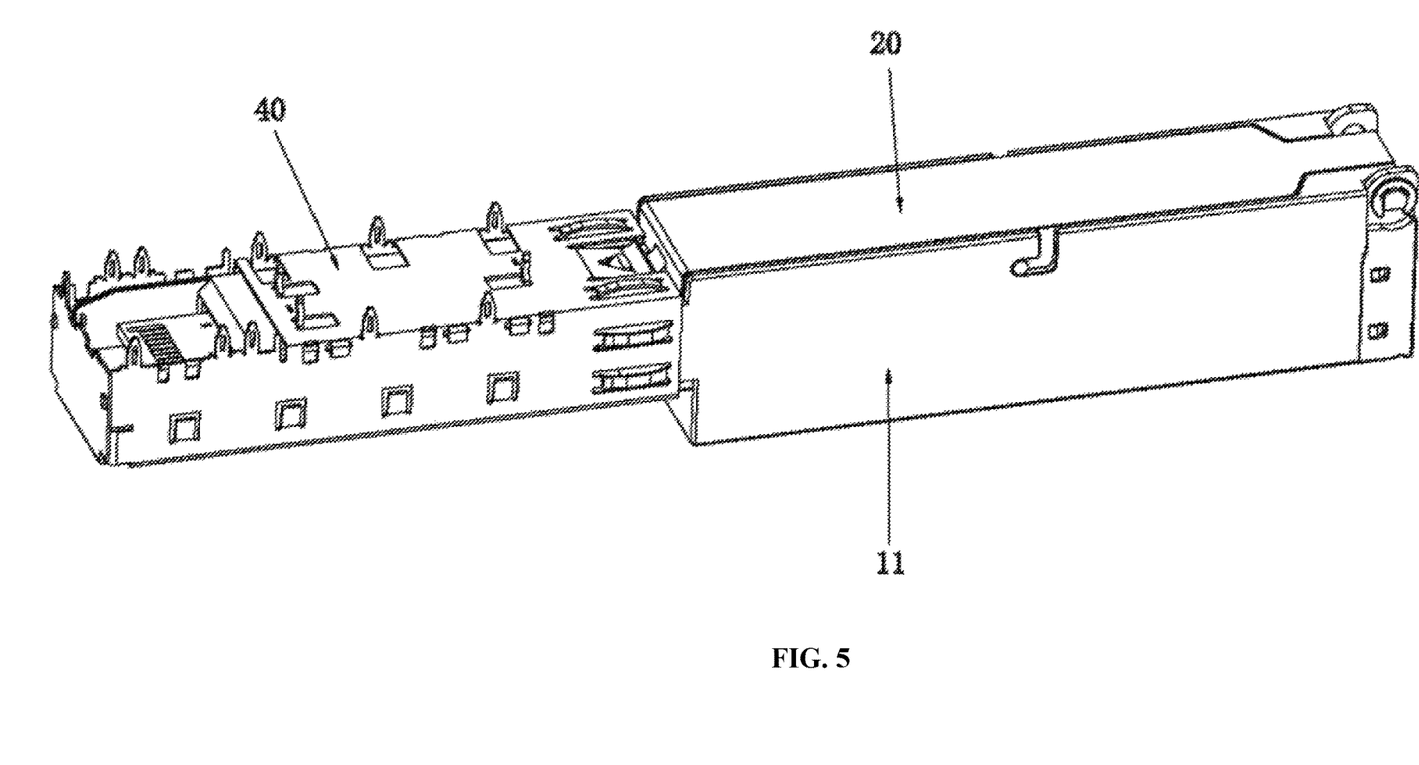
FIG. 5 is a partial structural diagram of FIG. 1 (a first limiting housing and a second limiting housing are not shown)
Figure 6:
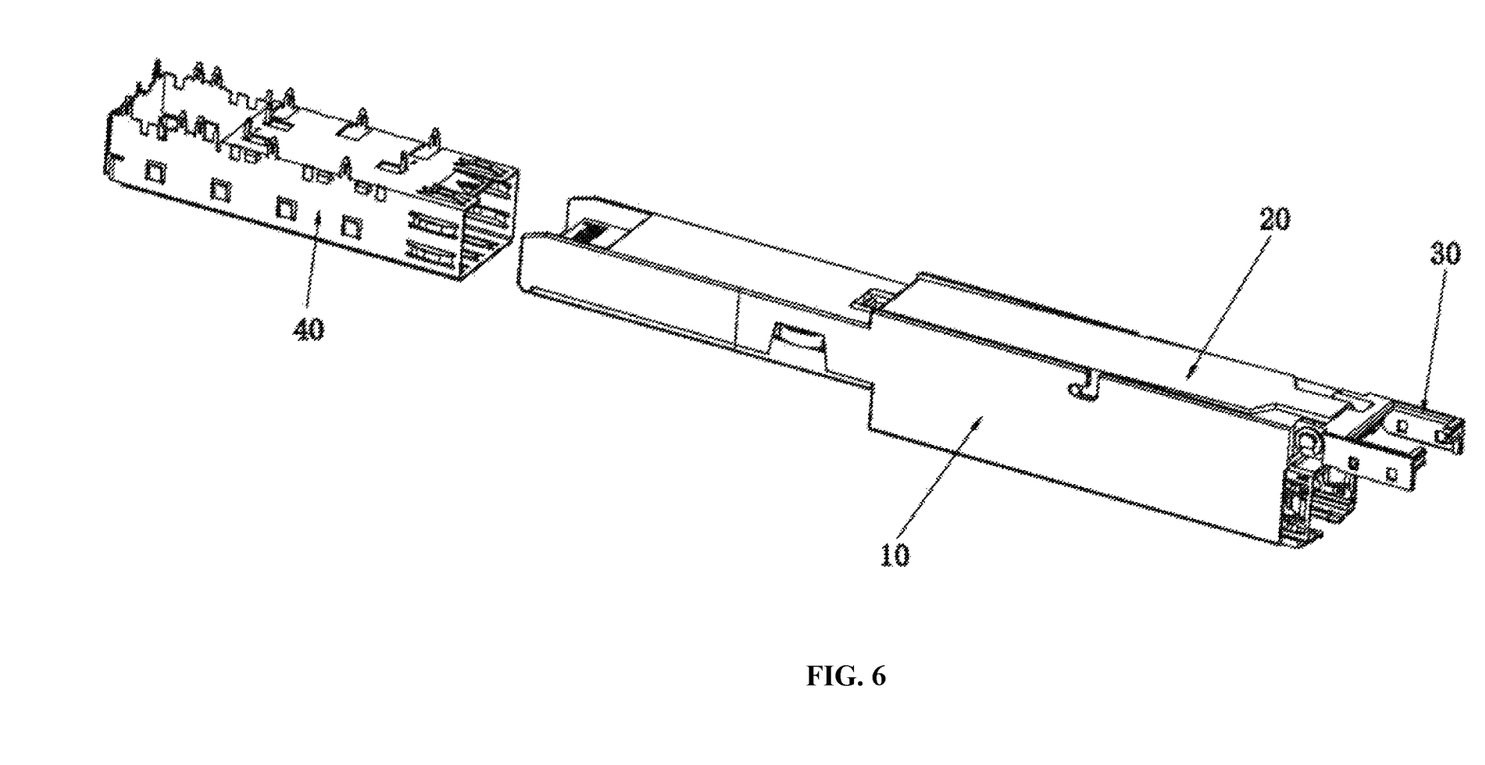
FIG. 6 is a schematic diagram of a first exploded structure of the embodiment of the present disclosure (the first limiting housing and the second limiting housing are not shown)
Figure 7:
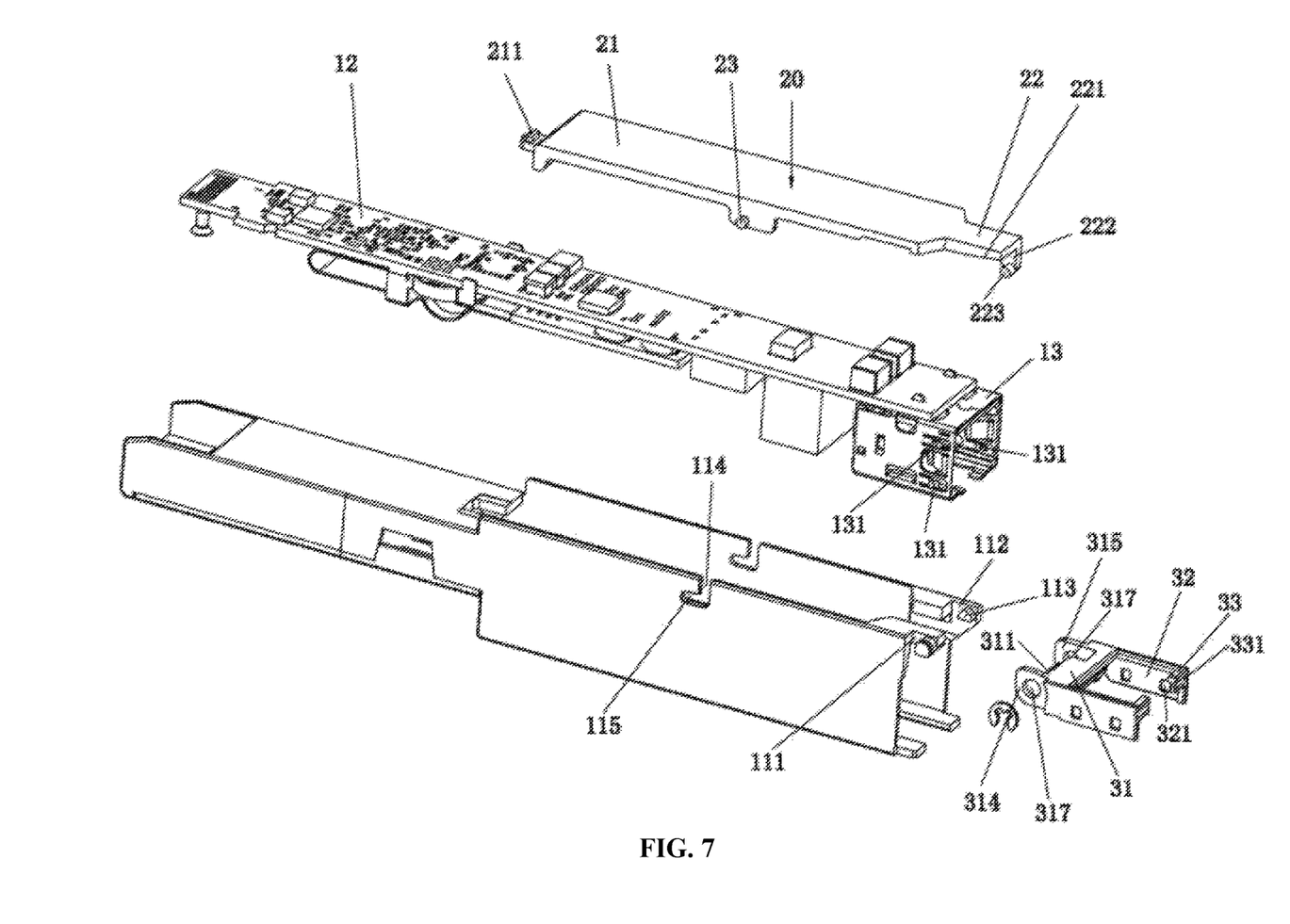
FIG. 7 is a schematic diagram of a second exploded structure of the embodiment of the present disclosure (the metal cage, the first limiting housing, and the second limiting housing are not shown)
Figure 8:
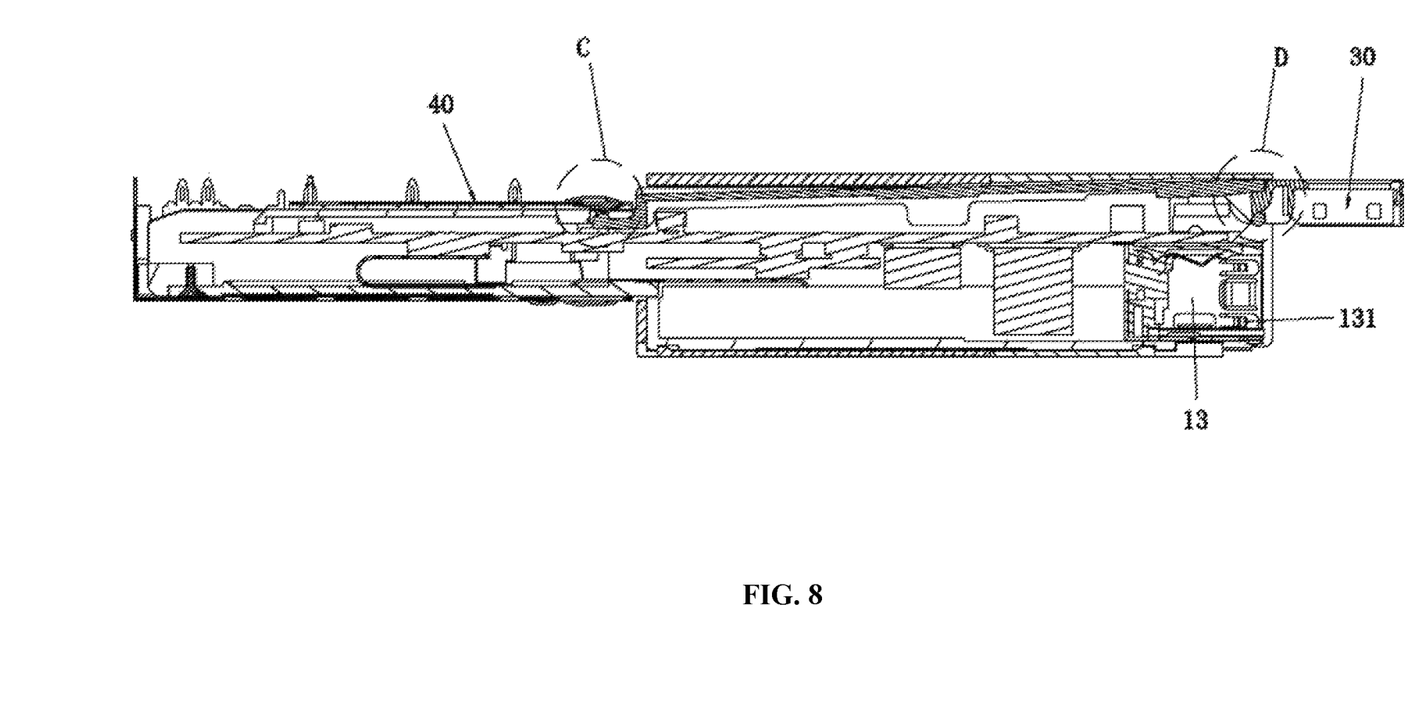
FIG. 8 is a schematic diagram of the first cross-sectional structure of the embodiment of the present disclosure (showing that the optical module body has been plugged into the metal cage for use)
Figure 9:
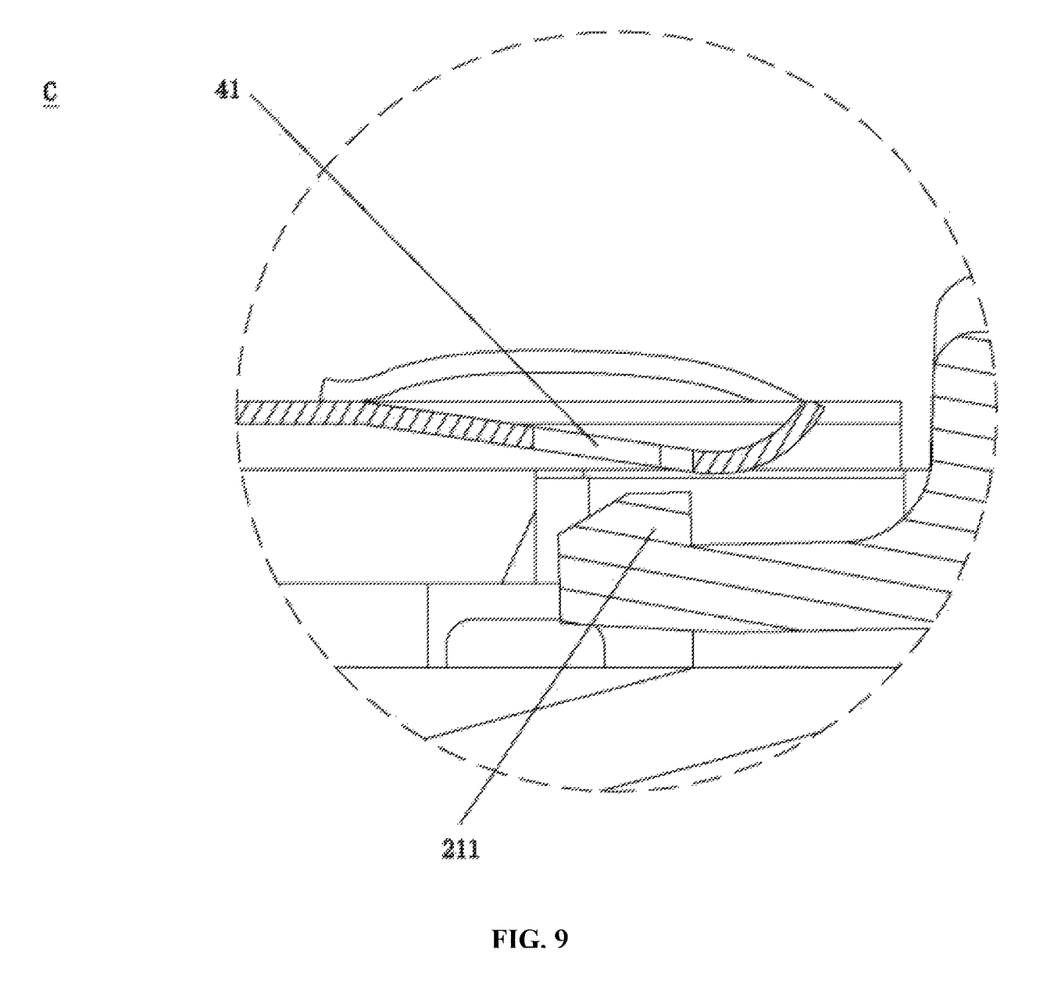
FIG. 9 is an enlarged schematic diagram of C in FIG. 8.
Figure 10:
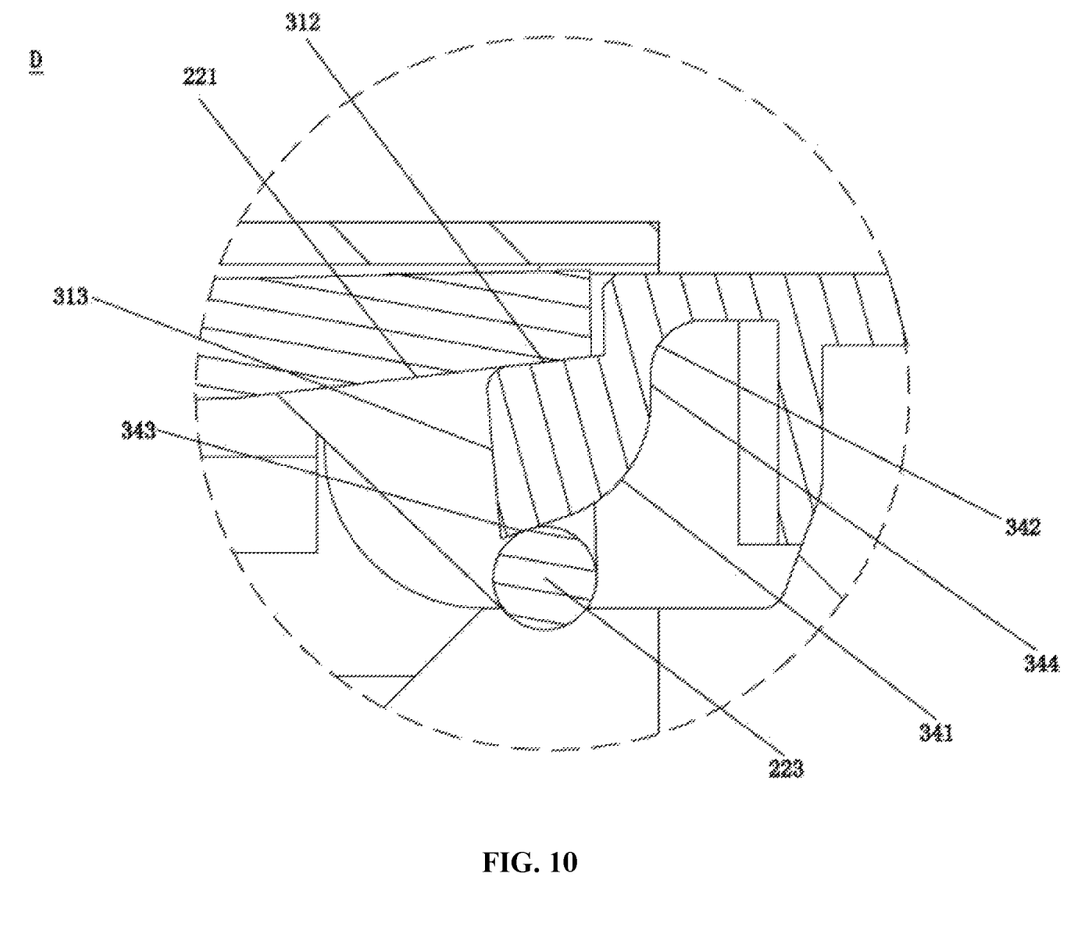
FIG. 10 is an enlarged schematic diagram of D in FIG. 8.
Figure 11:
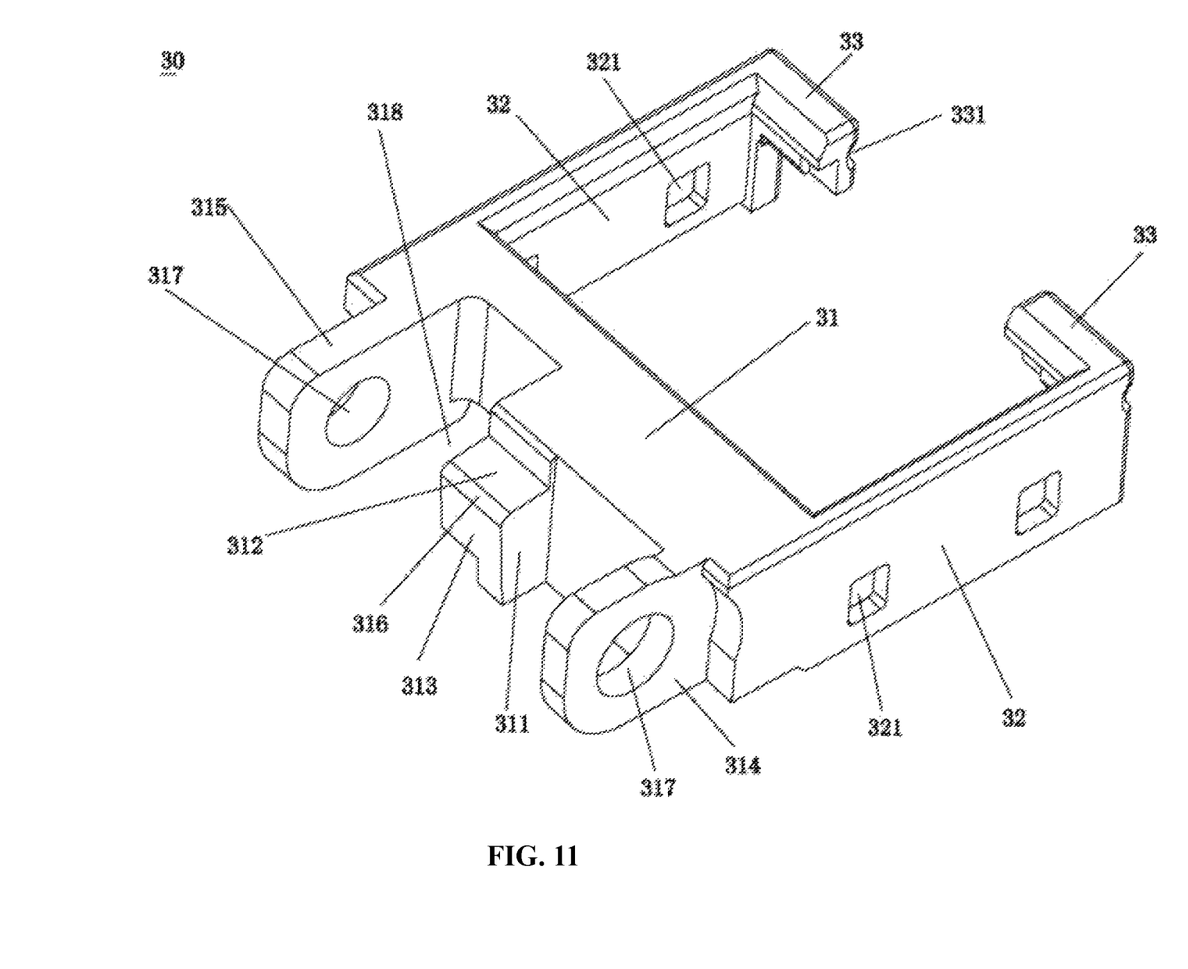
FIG. 11 is a schematic structural diagram of a pull ring of the embodiment of the present disclosure.
Figure 12:
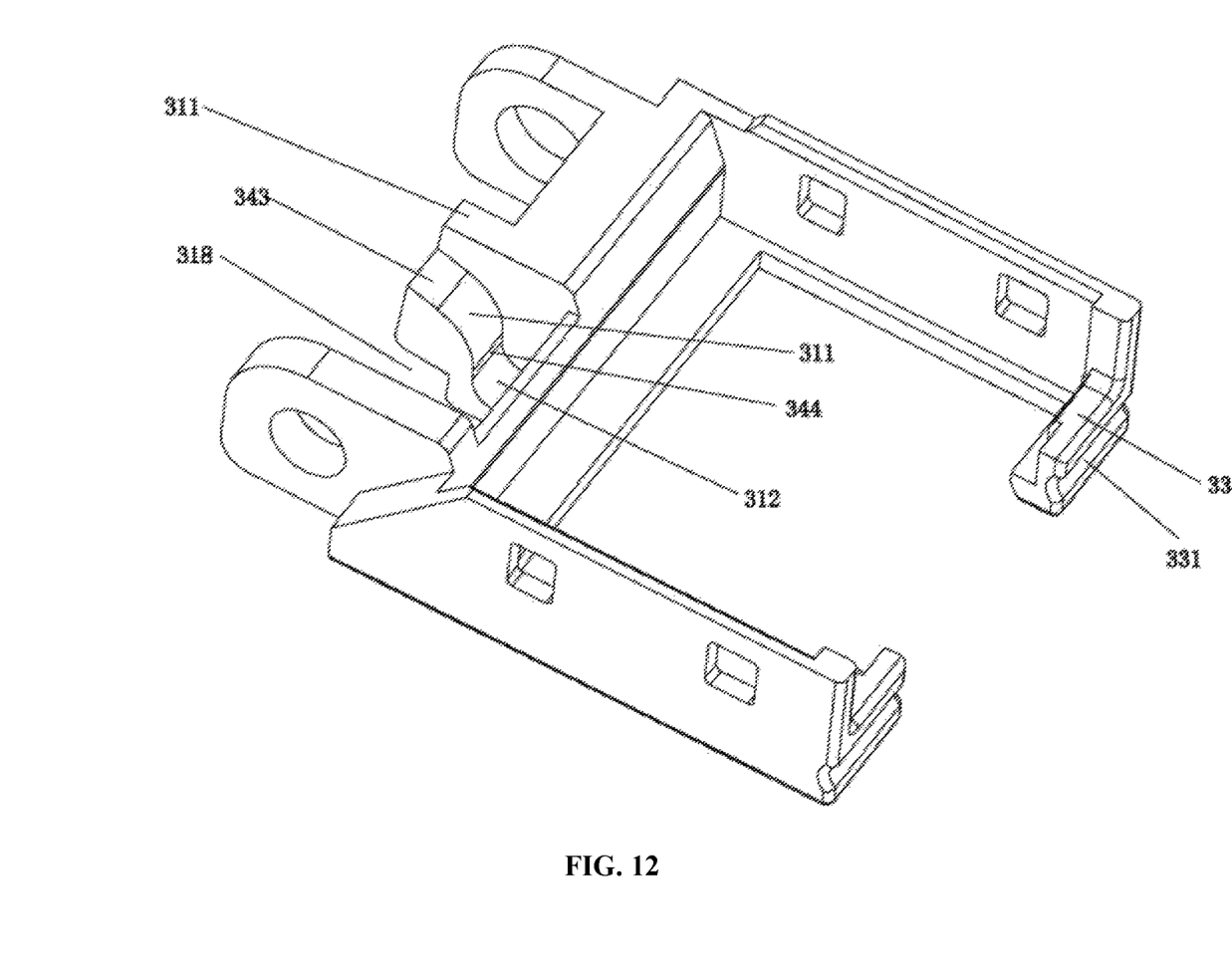
FIG. 12 is a schematic structural diagram of the pull ring of the embodiment of the present disclosure from another perspective.

In the present embodiment, the pull ring 30 includes a cross arm 31 extending in a left-right direction and a cantilever 32 integrally connected to the cross arm 31, the cross arm 31 is pivotally connected to the optical module body 10, and the unlocking contact surface 312 and the locking contact surface 313 are both formed in the cross arm 31. In the present embodiment, two cantilevers 32 are arranged, and the two cantilevers are formed by integrally extending backward from a left end and a right end of the cross arm 31 respectively. Preferably, a hand-held part 33 protrudes inward from an inner side of the cantilever 32, and a groove 331 for fingers to hold is formed in the hand-held part 33.

In the present embodiment, a protruding part 311, and a left mounting ear part 314 and a right mounting ear part 315 respectively located on left and right sides of the protruding part 311 are formed in the cross arm 31, the protruding part 311 and the cantilever 32 are respectively located on opposite sides of the cross arm 31, and the left mounting ear part 314, the right mounting ear part 315, and the protruding part 311 are both located on the same side of the cross arm 31. The unlocking contact surface 312 and the locking contact surface 313 are both formed in the protruding part 311, and a step is formed between the unlocking contact surface 312 and the locking contact surface 313. An arc transition surface 316 is formed in the protruding part 311, and the arc transition surface 316 is located between the unlocking contact surface 312 and the locking contact surface 313. Pivot holes 317 are formed on both the left mounting ear part 314 and the right mounting ear part 315, and the left mounting ear part 314 and the right mounting ear part 315 are pivotally connected to the optical module body 10 through corresponding pivot holes 317 respectively.

Figure 13:
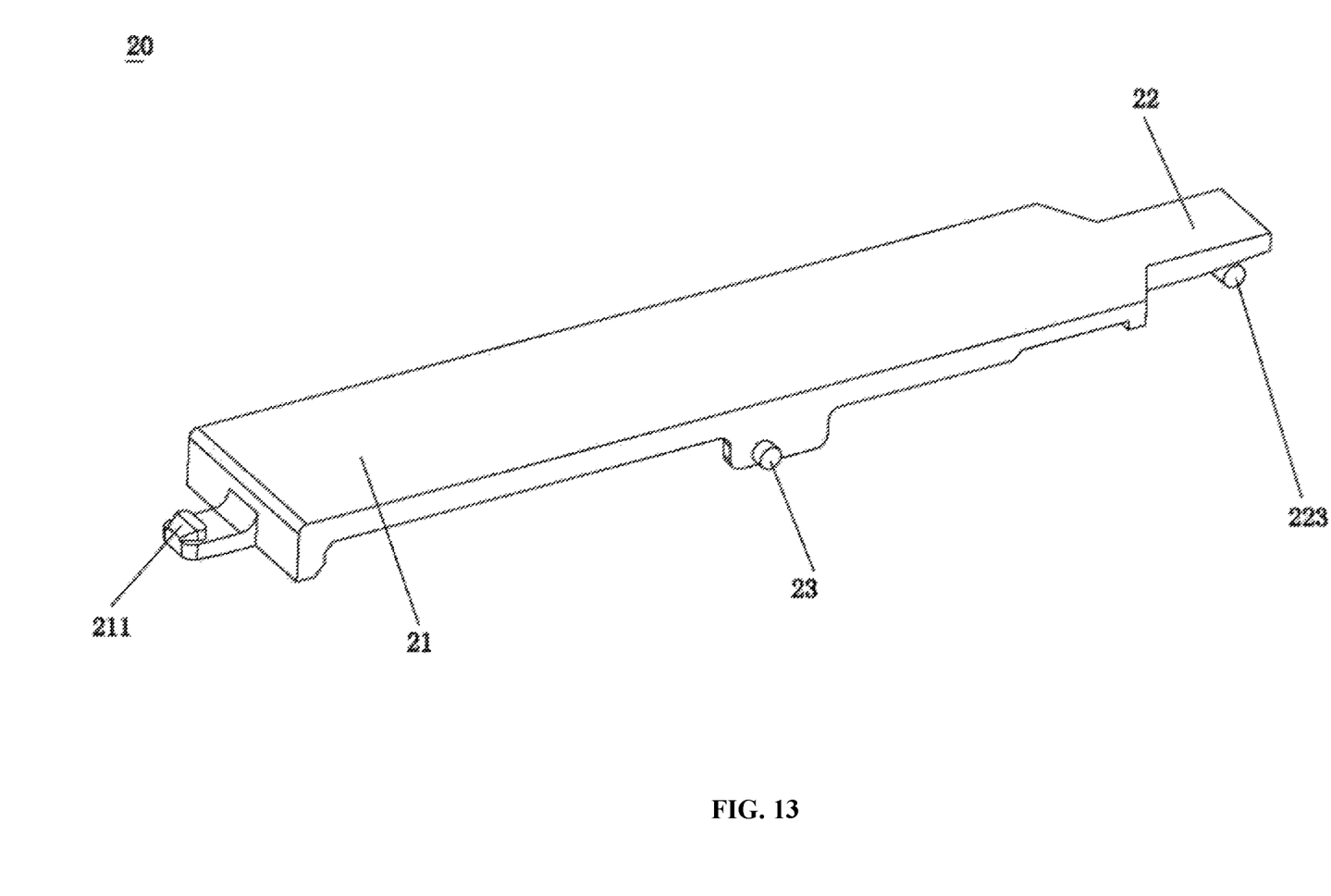
FIG. 13 is a schematic structural diagram of a cover plate of the embodiment of the present disclosure.
Figure 14:
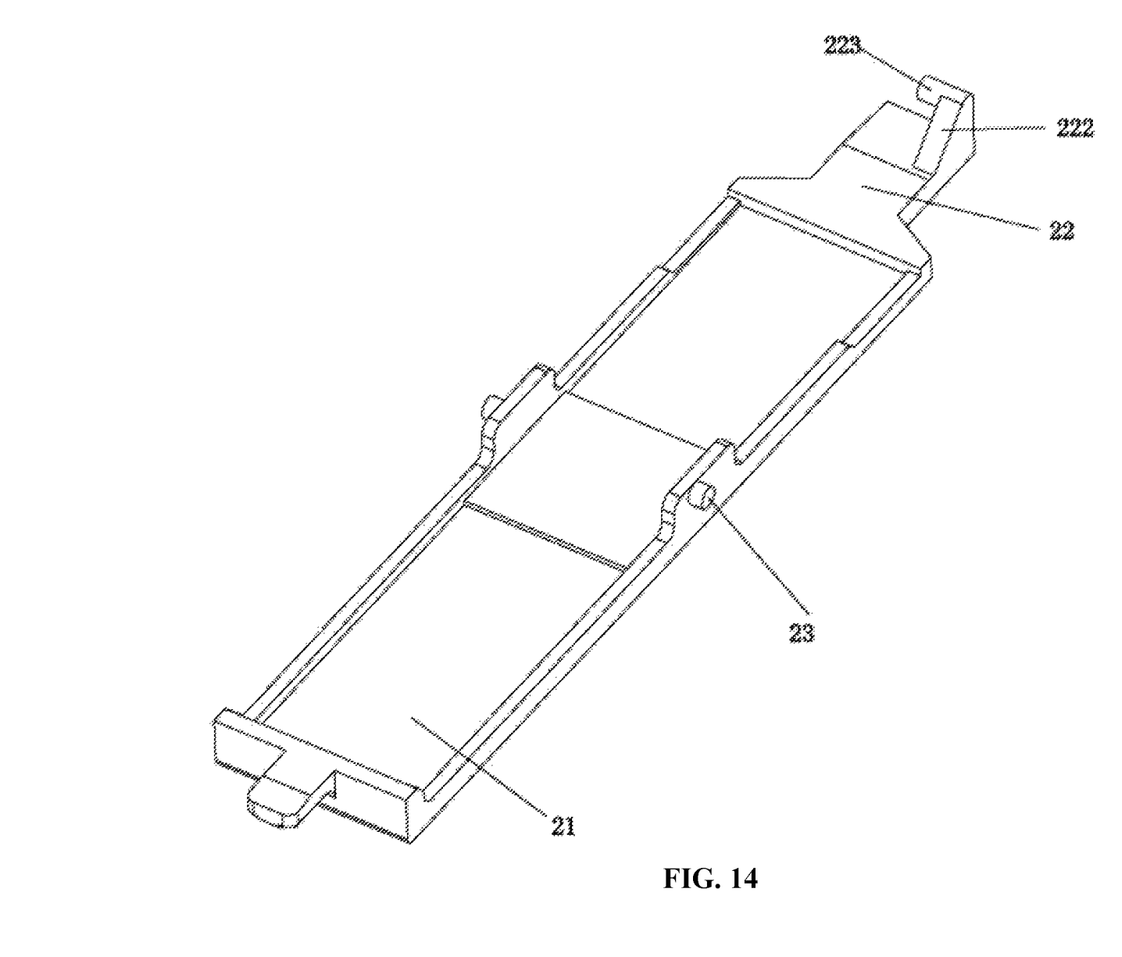
FIG. 14 is a schematic structural diagram of the cover plate of the embodiment of the present disclosure from another perspective.

A force-bearing inclined surface 221 inclined upward from front to back is formed in a lower end surface of the second rotating arm 22, and the force-bearing inclined surface 221 selectively abuts against the unlocking contact surface 312 or the locking contact surface 313. In the present embodiment, the unlocking contact surface 312 and the locking contact surface 313 are both inclined surfaces, and a length of the unlocking contact surface 312 in a front and rear direction when it abuts against the force-bearing inclined surface 221 is less than a length of the locking contact surface 313 in the front and rear direction when it abuts against the force-bearing inclined surface 221.

In the present embodiment, an extension block 222 protrudes downward from the force-bearing inclined surface 221, a guide shaft part 223 protrudes inward from an inner side surface of the extension block 222, and a guide groove penetrating into the inside of the cross arm 31 is correspondingly recessed into the protruding part 311. The unlocking contact surface 312, the locking contact surface 313, and the arc transition surface 316 are located on opposite sides of the protruding part with the guide groove.

The guide shaft part 223 is fitted in the guide groove. A relief groove 318 is formed in a position of the cross arm 31 corresponding to the extension block 222, and the relief groove 318 is communicated with the guide groove. In the present embodiment, the guide groove includes an introduction slope 343, a first groove surface 341, a transition slope 344, and a second groove surface 342 sequentially connected from the inside out. The first groove surface 341 is a convex arc surface, the second groove surface 342 is an inner arc surface, and a radius of a circle where an axial section of the first groove surface 341 is located is greater than a radius of a circle where an axial section of the second groove surface 342 is located. An opening is formed in the locking contact surface 313, and the opening is communicated with the guide groove. Preferably, a rotation space for step rotation is formed between the guide shaft part 223 and the force-bearing inclined surface 221.

A plug connector 13 is arranged at a rear end of the optical module body 10, the plug connector 13 is exposed outside the optical module body 10, elastic contact ends 131 are formed on both left and right sides of the plug connector 13, a through hole 321 penetrating inner and outer sides of the cantilever is formed in the cantilever 32, and the elastic contact end 131 is fitted in the through hole 321 and extends out of the cantilever 32. At this time, the pull ring 30 is connected to the plug connector 13, and the cantilever 32 receives and covers the structure of the plug connector 13 that is exposed outside the optical module body 10, which can protect the structure of the plug connector 13 that is exposed outside the optical module body 10. The structure is compact, which does not affect the normal use of the optical module, and the plug connector 13 is not visible in appearance.

The optical module body 10 includes a base 11, a circuit board 12, and a first limiting housing 14 and a second limiting housing 15 sleeved on the periphery of a rear section of the base. The first limiting housing 14 is located in front of the second limiting housing 15, the cover plate 20 is mounted in the first limiting housing 14 and the second limiting housing 15, and the lock head protrusion is exposed outside the first limiting housing. When the optical module body has been locked in the metal cage 40, the pull ring 30 is located in the second limiting housing 15. A mounting cavity 101 penetrating back and forth is formed in the base 11, and the circuit board 12 is mounted in the mounting cavity 101. The aforementioned plug connector 13 is electrically connected to the circuit board 12. The pull ring 30 is pivotally connected to a rear end of the base 11. The aforementioned plug connector 13 is mounted in the mounting cavity 101 and exposed outside the rear end of the installation cavity 101.

Preferably, a first rear mounting block 111 and a second rear mounting block 112 in left-to-right spacing arrangement respectively extend out of a rear part of the rear end of the base 11, and a rotating shaft 113 is arranged on an outer side of the first rear mounting block 111 and an inner side of the second rear mounting block 112. The left mounting ear part 314 is pivotally connected to the rotating shaft 113 of the first rear mounting block 111 through its pivot hole 317, the right mounting ear part 315 is pivotally connected to the rotating shaft 113 of the second rear mounting block 112 through its pivot hole 317, and the two pivot holes 317 and the two rotating shafts 113 are both located on the same axis.

An upper end opening penetrating the rear end of the base 11 is formed in the mounting cavity 101, the pivot part 23 of the cover plate 20 is pivotally connected to the upper end opening of the mounting cavity 101, and the cover plate 20 covers the upper end opening of the mounting cavity 101. In the present embodiment, a pivot groove is recessed into an upper end surface of the base 11 on a left side and/or right side of the upper end opening. The pivot groove has a vertical groove 114 extending in an up and down direction and a transverse groove 115 extending in the front and rear direction, a rear end of the transverse groove 115 is communicated with the vertical groove 114, the pivot part 23 of the cover plate 20 is fitted in the transverse groove 115 from the vertical groove 114, and the pivot part 23 is located at a front end of the transverse groove 115.

Next, a working principle of unlocking or locking the connection between the optical module body 10 and the metal cage 40 will be roughly explained (by default, when the optical module body 10 has been plugged into the metal cage 40 for use, the pull ring 30 is arranged vertically).

When it is necessary to unlock the connection between the optical module body 10 and the metal cage 40, the groove 331 of the hand-held part 33 can be held by fingers, and the pull ring 30 can be pulled up, such that the pull ring 30 rotates around the rotating shaft 113. During the rotation of the pull ring 30, the unlocking contact surface 312 abuts against and applies a force to the force-bearing inclined surface 221, and the second rotating arm 22 rotates upward. Due to the lever action, the first rotating arm 21 rotates downward to drive the lock head protrusion 211 to move down, when the lock head protrusion 211 is completely separated from the spring lock groove 41 of the metal cage 40, the optical module body 10 can be pulled back, and at the same time, the pull ring 30 is rotated to a horizontal position.

Then, when the optical module body 10 needs to be plugged into the metal cage 40 for use, after the optical module body 10 is inserted into the metal cage 40 and the pull ring 30 is rotated in an opposite direction, the locking contact surface 313 abuts against the second rotating arm 22 to make the lock head protrusion 211 interlocked with the spring lock groove 41 of the metal cage 40, and at the same time, the pull ring 30 is rotated to a vertical position.

The key design points of the present disclosure are as follows: the easy-to-unlock optical module can realize unlocking and locking between the optical module body and the metal cage, is convenient to use, has a compact structure, eliminates an elastic structure in the traditional technology, and improves the stability and reliability during use mainly through the mechanism of the pull ring.

Secondly, through the cooperation of the guide shaft part and the guide groove, the efficiency and stability of locking are improved.

Furthermore, through the cooperation of the elastic contact end of the plug connector and the through hole on the pull ring, the pull ring can be stored in the plug connector after locking, so as to save space, make the appearance of the easy-to-unlock optical module more beautiful, and increase the practicability of the easy-to-unlock optical module. In particular, the groove is formed in the pull ring to facilitate separation of the pull ring from the plug connector.

In addition, the overall structure design is ingenious and reasonable, and the components are assembled easily and firmly, which further ensures the stability and reliability during use.

The above described are merely preferred embodiments of the present disclosure and are not intended to limit the present disclosure in any form. Any simple changes, equivalent variations and modifications made to the above embodiments based on the technical essence of the present disclosure should fall within the scope defined by the technical solutions of the present disclosure.

What is claimed is:

1. An easy-to-unlock optical module, comprising an optical module body and a mechanism of a pull ring for unlocking or locking connection between the optical module body and a metal cage, wherein the mechanism of the pull ring comprises a cover plate and the pull ring arranged on the optical module body;

a pivot part for pivotally connecting the optical module body, and a first rotating arm and a second rotating arm respectively located on front and rear sides of the pivot part are arranged on the cover plate, and a lock head protrusion for matching with a spring lock groove on the metal cage is formed in the first rotating arm;

the pull ring is pivotally connected to the optical module body, an unlocking contact surface and a locking contact surface are formed in the pull ring, and the second rotating arm selectively abuts against the unlocking contact surface or the locking contact surface;

when the optical module body is pulled out from the metal cage, after the pull ring is rotated, the unlocking contact surface abuts against the second rotating arm to separate the lock head protrusion from the spring lock groove of the metal cage; and when the optical module body is plugged into the metal cage for use, after the optical module body is inserted into the metal cage and the pull ring is rotated in an opposite direction, the locking contact surface abuts against the second rotating arm to make the lock head protrusion interlocked with the spring lock groove of the metal cage.

2. The easy-to-unlock optical module according to claim 1, wherein the pull ring comprises a cross arm extending in a left-right direction and a cantilever integrally connected to the cross arm, the cross arm is pivotally connected to the optical module body, and the unlocking contact surface and the locking contact surface are both formed in the cross arm.

3. The easy-to-unlock optical module according to claim 2, wherein a protruding part is formed in the cross arm, the protruding part and the cantilever are respectively located on opposite sides of the cross arm, the unlocking contact surface and the locking contact surface are both formed in the protruding part, and a step is formed between the unlocking contact surface and the locking contact surface.

4. The easy-to-unlock optical module according to claim 3, wherein a force-bearing inclined surface inclined upward from front to back is formed in a lower end surface of the second rotating arm, and the force-bearing inclined surface selectively abuts against the unlocking contact surface or the locking contact surface.

5. The easy-to-unlock optical module according to claim 4, wherein an extension block protrudes downward from the force-bearing inclined surface, a guide shaft part protrudes inward from an inner side surface of the extension block, a guide groove penetrating into the inside of the cross arm is correspondingly recessed into the protruding part, and the guide shaft part is fitted in the guide groove.

6. The easy-to-unlock optical module according to claim 5, wherein a rotation space for step rotation is formed between the guide shaft part and the force-bearing inclined surface.

7. The easy-to-unlock optical module according to claim 5, wherein a relief groove is formed in a position of the cross arm corresponding to the extension block, and the relief groove is communicated with the guide groove; and an opening is formed in the locking contact surface, and the opening is communicated with the guide groove.

8. The easy-to-unlock optical module according to claim 2, wherein a plug connector is arranged at a rear end of the optical module body, the plug connector is exposed outside the optical module body, an elastic contact end is formed in the plug connector, a through hole penetrating inner and outer sides of the cantilever is formed in the cantilever, and the elastic contact end is fitted in the through hole and extends out of the cantilever.

9. The easy-to-unlock optical module according to claim 2, wherein a hand-held part protrudes inward from an inner side of the cantilever, and a groove for fingers to hold is formed in the hand-held part.

10. The easy-to-unlock optical module according to claim 1, wherein the optical module body comprises a base and a circuit board, a mounting cavity penetrating back and forth is formed in the base, and the circuit board is mounted in the mounting cavity; and an upper end opening is formed in the mounting cavity, the pivot part of the cover plate is pivotally connected to the upper end opening of the mounting cavity and the cover plate covers the upper end opening of the mounting cavity, and the pull ring is pivotally connected to a rear end of the base.

* * * * *